（12) United States Patent
No

(10) Patent No.: US 11,680,744 B2
(45) Date of Patent: Jun. 20, 2023

(54) ARTIFICIAL INTELLIGENCE REFRIGERATOR

(71) Applicant: LG ELECTRONICS INC., Seoul (KR)

(72) Inventor: Hyohoun No, Seoul (KR)

(73) Assignee: LG ELECTRONICS INC., Seoul (KR)

(*) Notice: Subject to any disclaimer, the term of this patent is extended or adjusted under 35 U.S.C. 154(b) by 674 days.

(21) Appl. No.: 16/487,804

(22) PCT Filed: Jan. 21, 2019

(86) PCT No.: PCT/KR2019/000810
§ 371 (c)(1),
(2) Date: Oct. 22, 2019

(87) PCT Pub. No.: WO2019/139457
PCT Pub. Date: Jul. 18, 2019

(65) Prior Publication Data
US 2020/0041200 A1 Feb. 6, 2020

(51) Int. Cl.
*F25D 27/00* (2006.01)
*F25D 29/00* (2006.01)
(Continued)

(52) U.S. Cl.
CPC ........ *F25D 29/008* (2013.01); *F21V 33/0044* (2013.01); *F25D 25/021* (2013.01);
(Continued)

(58) Field of Classification Search
CPC .. F25D 27/005; F25D 29/0056; F25D 29/008; F25D 2700/06; F25D 2331/812; B05D 19/048
See application file for complete search history.

(56) References Cited

U.S. PATENT DOCUMENTS

2014/0261189 A1 9/2014 Chait

FOREIGN PATENT DOCUMENTS

JP H05045041 2/1993
JP 2010255877 11/2010
(Continued)

OTHER PUBLICATIONS

JP2010255877 Translation (Year: 2010).*
(Continued)

*Primary Examiner* — Brian M King
(74) *Attorney, Agent, or Firm* — Lee, Hong, Degerman, Kang & Waimey PC

(57) ABSTRACT

An artificial intelligence refrigerator includes a communication unit, a camera configured to capture an image of a tray including a plurality of grooves for storing food, and a processor configured to control the communication unit and the camera. The processor extracts a marker hidden by the food of a plurality of markers respectively attached to the plurality of grooves from the captured image of the tray, acquires a position identifier of a groove corresponding to the hidden marker and a reception time indicating that the food is received in the groove, transmits the acquired position identifier and the reception time to a server through the communication unit, receives determined color information from the server based on the reception time, and controls a light emitting element provided in the groove to output a color to be displayed on the groove included in the received color information.

11 Claims, 7 Drawing Sheets

(51) Int. Cl.
　　　*F21V 33/00*　　　　(2006.01)
　　　*F25D 25/02*　　　　(2006.01)
　　　*G05B 19/048*　　　(2006.01)
　　　*F21Y 115/15*　　　(2016.01)
(52) U.S. Cl.
　　　CPC ......... *F25D 27/005* (2013.01); *G05B 19/048* (2013.01); *F21Y 2115/15* (2016.08); *F25D 2331/812* (2013.01); *F25D 2700/06* (2013.01)

(56)　　　　　　References Cited

FOREIGN PATENT DOCUMENTS

| | | |
|---|---|---|
| JP | 2017015298 | 1/2017 |
| KR | 1020080030173 | 4/2008 |
| KR | 1020180049663 | 5/2018 |

OTHER PUBLICATIONS

JPH054041 Translation.*
KR20180049663 Translation.*
KR20080030173 Translation.*
PCT International Application No. PCT/KR2019/000810, Written Opinion of the International Searching Authority dated Oct. 17, 2019, 10 pages.

* cited by examiner

CURRENT TIME 01/15 15:00, EXPIRATION DATE: 10 DAYS

| POSITION IDENTIFIER | RECEPTION TIME | RETENTION PERIOD | FRESHNESS | COLOR |
|---|---|---|---|---|
| 1 | 01/02 15:00 | 9 DAY | 10 | RED |
| 3 | 01/06 15:00 | 5 DAY | 50 | ORANGE |
| 4 | 01/08 15:00 | 3 DAY | 70 | YELLOW |
| 7 | 01/10 15:00 | 1 DAY | 90 | GREEN |

ARTIFICIAL INTELLIGENCE REFRIGERATOR

CROSS-REFERENCE TO RELATED APPLICATIONS

This application is the National Stage filing under 35 U.S.C. 371 of International Application No. PCT/KR2019/000810, filed on Jan. 21, 2019, the contents of which are hereby incorporated by reference herein its entirety.

TECHNICAL FIELD

The present invention relates to an artificial intelligence refrigerator and, more particularly, to an artificial intelligence refrigerator capable of providing information on a food product received therein.

BACKGROUND ART

A refrigerator is an apparatus capable of keep food fresh for a predetermined period, by cooling a freezing compartment or a refrigerating compartment at a specific temperature while repeating a freezing or refrigerating cycle. In general, the refrigerator includes a main body defining a storage space and a door for opening or closing the storage space. Stored objects such as food may be stored in the storage space and a user may open the door in order to store the stored objects or take out the stored objects.

Recently, with diffusion of refrigerators and development of technology, various requirements for additional functions of the refrigerator are increasing.

In particular, when food such as an egg are stored in a refrigerator through a tray, a function of indicating freshness or an expiration date of the egg has appeared.

Conventionally, a sensor for detecting whether eggs are respectively stored in a plurality of grooves provided in the tray is provided.

However, when the number of grooves configuring the tray increases, the number of sensors increases and thus costs increase.

In addition, since the recommended expiration date cannot be input to the refrigerator, when the eggs are received in the refrigerator, it is impossible to accurately check the freshness of each egg.

PRIOR ART DOCUMENT

Patent Document

1. US Patent Laid-Open Publication No. 20140261189 (published on Sep. 18, 2014)

DISCLOSURE

Technical Problem

An object of the present invention devised to solve the problem lies in an artificial intelligence refrigerator capable of checking and feeding freshness of food received therein back to a user.

Another object of the present invention devised to solve the problem lies in an artificial intelligence refrigerator capable of more accurately checking freshness of food received therein.

Technical Solution

An artificial intelligence refrigerator according to an embodiment of the present invention can capture images of markers respectively attached to a plurality of grooves configuring a tray, determine whether food is received, and output a visual feedback according to determined freshness based on the reception time of the food and the position identifier of a groove.

An artificial intelligence refrigerator according to an embodiment of the present invention can determine the freshness of the food using a difference between the expiration time of the food received from the mobile terminal of a user and the reception time of the food and output a visual feedback according to the determined freshness.

Advantageous Effects

According to the embodiment of the present invention, as the freshness of the food received in a refrigerator is visually output, a user can immediately check the freshness of the food. Therefore, it is possible to rapidly determine intake and disposal of the food.

According to the embodiment of the present invention, as the expiration date of the food is used to determine the freshness of the food, it is possible to accurately check the freshness of the food.

DESCRIPTION OF DRAWINGS

FIG. 6 is a table showing an example of determining a color to be displayed on a groove, in which a food product is stored, based on freshness of the food product according to an embodiment of the present invention.

BEST MODE

Hereinafter, embodiments disclosed in this specification will be described with reference to the accompanying drawings. The accompanying drawings are used to help easily understand the embodiments disclosed in this specification and it should be understood that the technical ideas disclosed in this specification are not limited by the accompanying drawings and include all alterations, equivalents and substitutes within the spirit and scope of the present invention.

Figure 1:
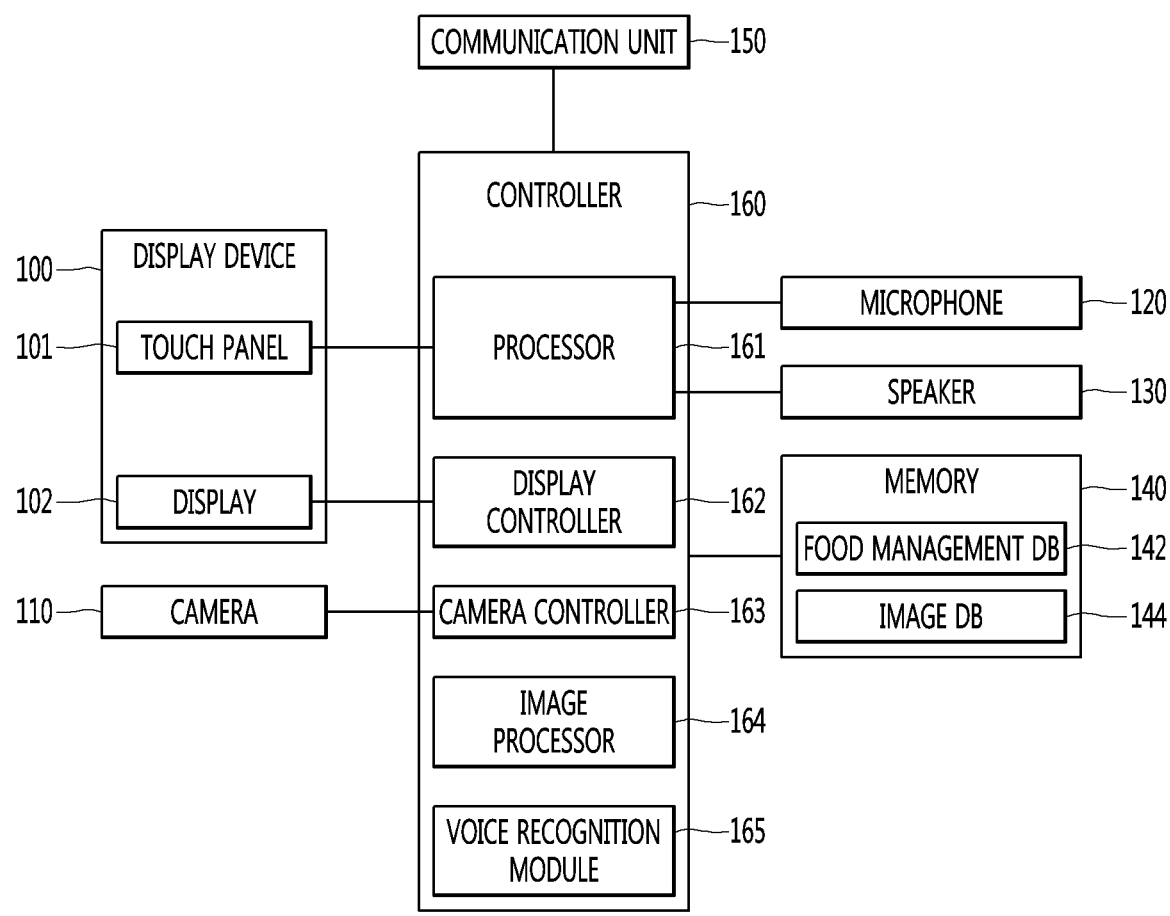
FIG. 1 is a block diagram showing the control configuration of a refrigerator according to an embodiment of the present invention.

FIG. 1 is a block diagram showing the control configuration of a refrigerator according to an embodiment of the present invention.

Referring to FIG. 1, the refrigerator 10 may include a camera 110, a microphone 120, a speaker 130, a memory 140, a communication unit 150 and a controller 160. The components shown in FIG. 1 are not essential for implementing the refrigerator 10 and the refrigerator 10 may include more or fewer components than the components shown in FIG. 1.

A display device 100 may include a touch panel 101 for receiving touch input from a user and a display 102 for displaying graphics or text. The touch panel 101 and the display 102 may be formed integrally or as separate stacked components.

A processor 161 included in the controller 160 may detect types of touch input (e.g., short-touch, long-touch, drag-and-drop, etc.) and acquire the coordinate information of touch input, based on touch input received through the touch panel 101.

A display controller 162 included in the controller 160 may control operation of the display 102 based on signals or data received from the processor 161. The display 102 may output graphics or text under control of the display controller 162.

The camera 110 may be disposed in the refrigerator 10. When a user opens a door 11, a camera controller 163 included in the controller 160 may control the camera 110 to acquire at least one image until the door 11 is closed. The at least one image acquired by the camera 110 may be stored in an image database (DB) 144 of the memory 140. In some embodiments, the at least one image acquired by the camera 110 may be transmitted to a server (not shown) or a terminal through the communication unit 150.

In some embodiments, the camera controller 163 may control the camera 110 to acquire an image when the opening angle of the door 11 reaches a predetermined opening angle. The predetermined opening angle may be an angle at which the camera 110 may acquire an image of the maximum area inside the refrigerator 10.

In some embodiments, the camera controller 163 may control the camera 110 to acquire the image of the inside of the refrigerator 10 based on a specific control command received through an input unit such as the touch panel 101 or the microphone 120.

Meanwhile, an image processor 164 of the controller 160 may extract a food image from the image acquired by the camera 110 through various image processing schemes. Alternatively, the image processor 164 may detect an image change caused by putting or taking food in or out of the refrigerator, from images acquired before and after opening the door 11. The processor 161 or the image processor 164 may detect food put in or taken out of the refrigerator based on the detected image change.

The microphone 120 may acquire voice from the user and provide the acquired voice to the processor 161. For example, the voice may be related to a function to be provided to the user with respect to particular food.

The voice may include at least one partial voice. The partial voice may be identification information (e.g., a food name) of the particular food or a command related to the function. That is, the voice may include at least one of the identification information of the particular food or the command.

The speaker 130 may output information related to operation of the refrigerator 10 in the form of sound or voice. In some embodiments, the refrigerator 10 may output information related to operation of the refrigerator 10 through the display device 100.

The memory 140 may store control data or an algorithm for operation of the components included in the refrigerator 10. Meanwhile, the memory 140 may include a food management dB 142 for storing a variety of information related to foods stored in the refrigerator 10 and an image DB 144 for storing the image acquired by the camera 110. In some embodiments, the food management DB 142 and the image DB 144 may be located in a server connected to the refrigerator 10 through the communication unit 150.

The communication unit 150 may include at least one communication module for connecting the refrigerator 10 with a terminal of a user or a server. For example, the communication unit 150 may include a wireless Internet module such as Wi-Fi and a short-range wireless communication module such as Bluetooth.

The controller 160 may control overall operation of the refrigerator 10. The controller 160 may control at least one component included in the refrigerator 10, in order to provide the user with the functions supported by the refrigerator 10.

The controller 160 may include at least one CPU, AP (application processor), controller, a microcomputer, an integrated circuit, etc. For example, as shown in FIG. 1, the controller 160 may include the processor 161, the display controller 162, the camera controller 163, the image processor 164, and a voice recognition module 165, without being limited thereto.

Meanwhile, the controller 160 or the processor 161 according to the embodiment of the present invention may input the voice acquired by the microphone 230 to the artificial intelligence based voice recognition module 165, thereby recognizing the voice. The voice recognition module 165 may recognize the at least one partial voice included in the voice and output a result of recognition including the recognized at least one partial voice.

As described above, the partial voice may be the identification information (e.g., the food name) of the particular food or the command related to the function. That is, the voice may include at least one of the identification information of the particular food or the command.

For example, the voice recognition module 165 may include a voice recognizer having an artificial neural network (ANN) learned through machine learning, thereby recognizing the received voice and outputting the result of recognition including the identification information or characteristic information.

The processor 161 may perform a function related to food management based on the result of recognition of the voice recognition module 165 and touch input acquired through the touch panel 101.

Figure 2:
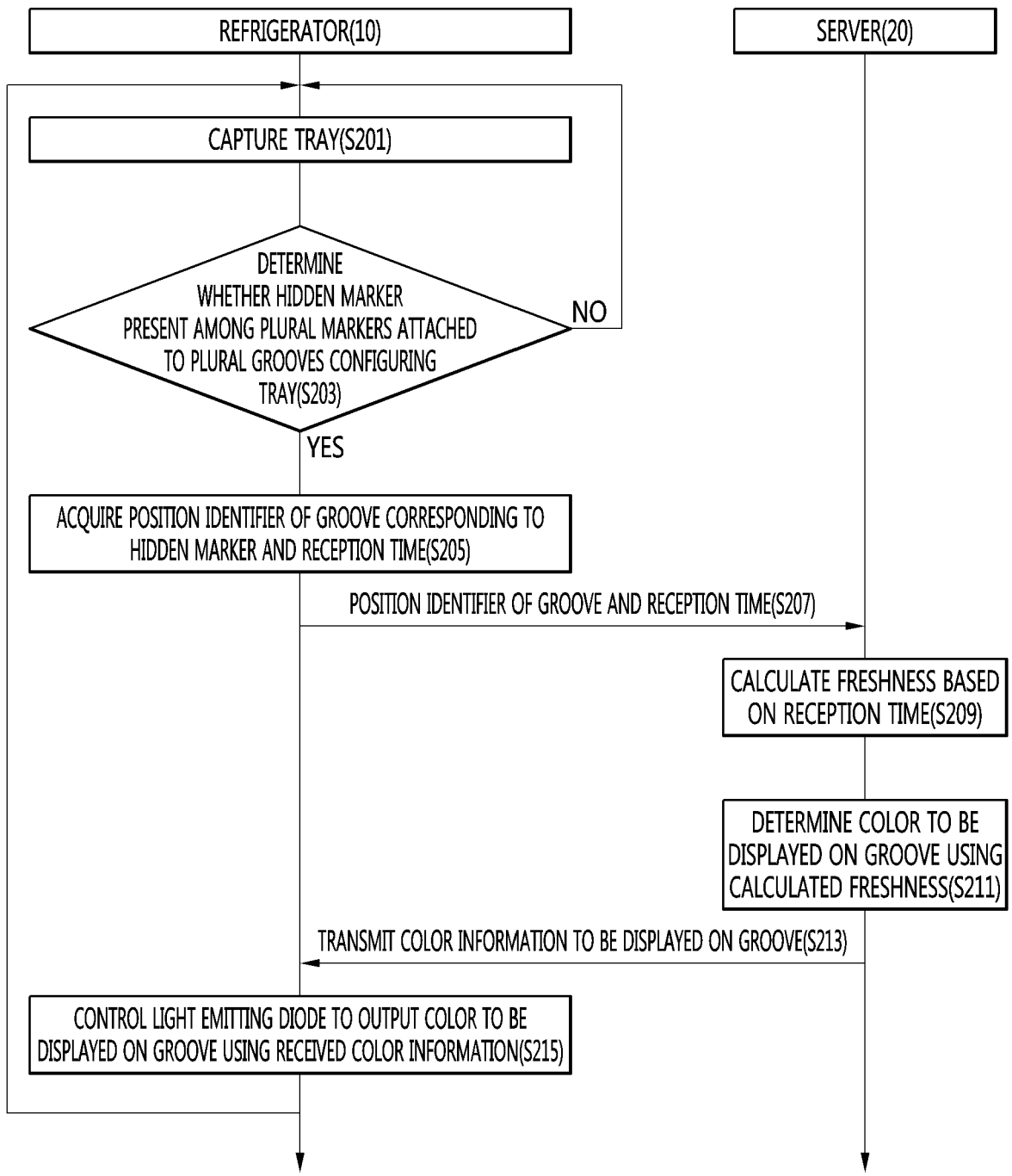
FIG. 2 is a ladder diagram illustrating a method of operating an artificial intelligence system according to an embodiment of the present invention.

FIG. 2 is a ladder diagram illustrating a method of operating an artificial intelligence system according to an embodiment of the present invention.

Referring to FIG. 2, the camera 110 of the refrigerator 10 captures an image of a tray (S201).

In one embodiment, the camera controller 163 may periodically capture the image of the tray.

The tray may include a plurality of grooves, in which food products are respectively stored.

The food products may be eggs. This is merely an example and any food products capable of being stored may be used.

The camera 110 may be disposed in an upper space spaced apart from the tray.

The arrangement structure of the camera 110 and the tray will be described with reference to FIGS. 3 to 5.

Figure 3:
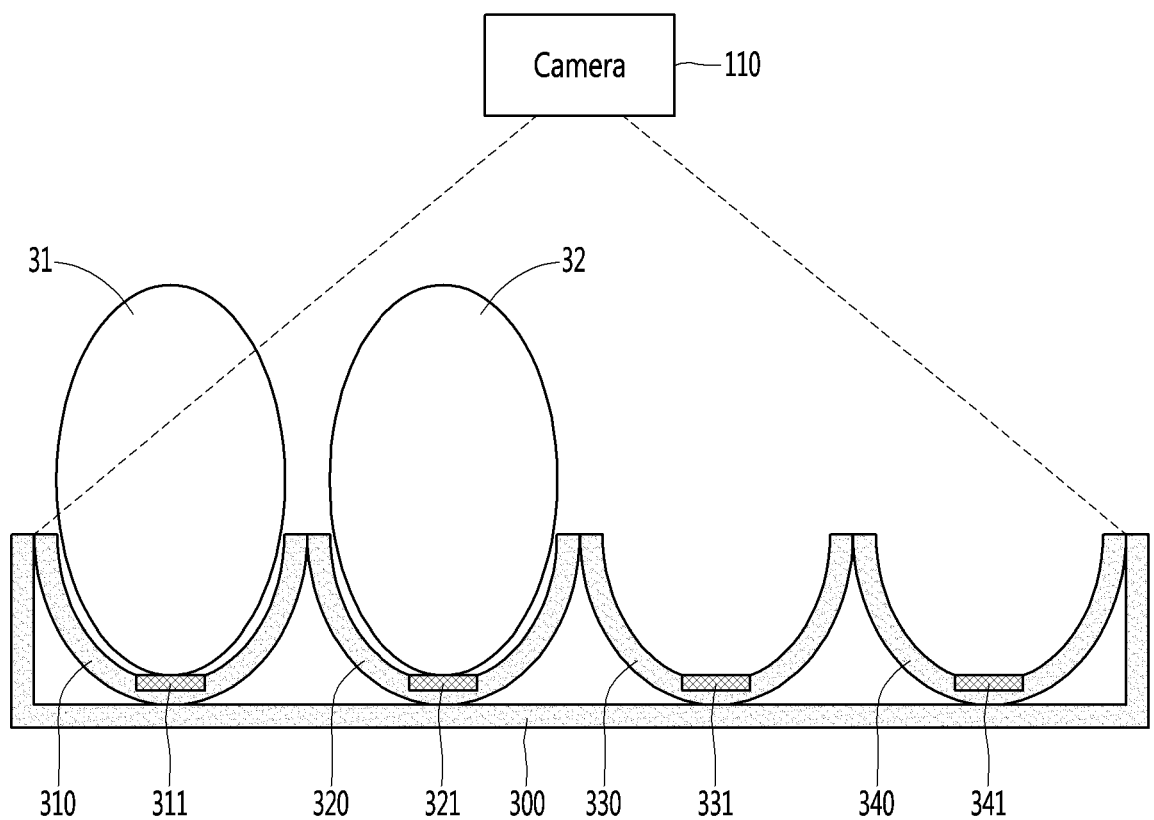
FIGS. 3 to 5 are views illustrating the arrangement structure between a camera and a tray according to an embodiment of the present invention.
Figure 4:
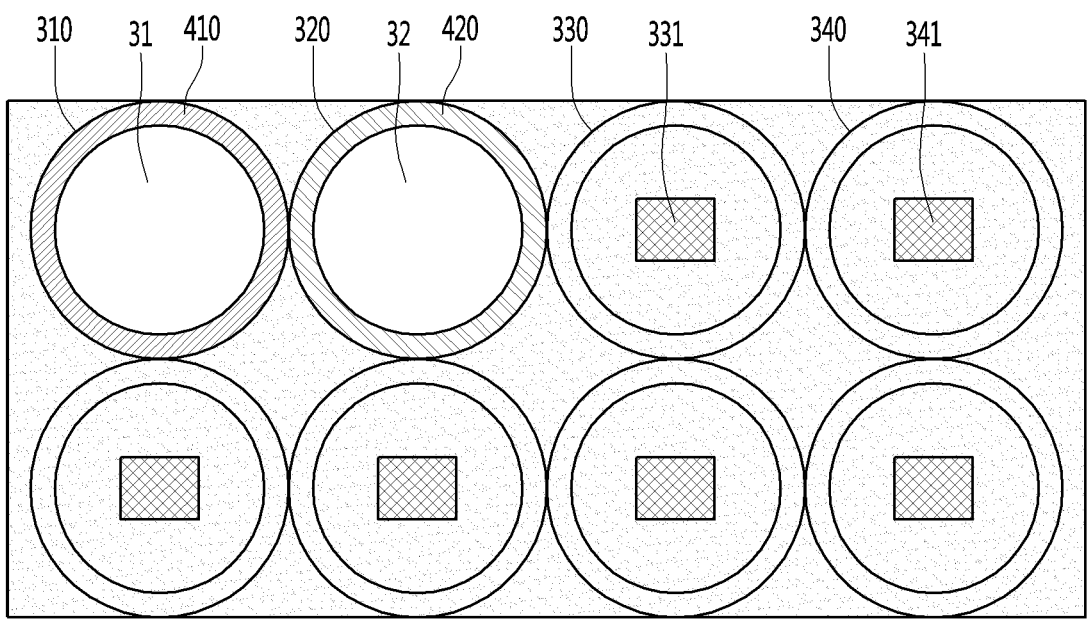
Figure 5:
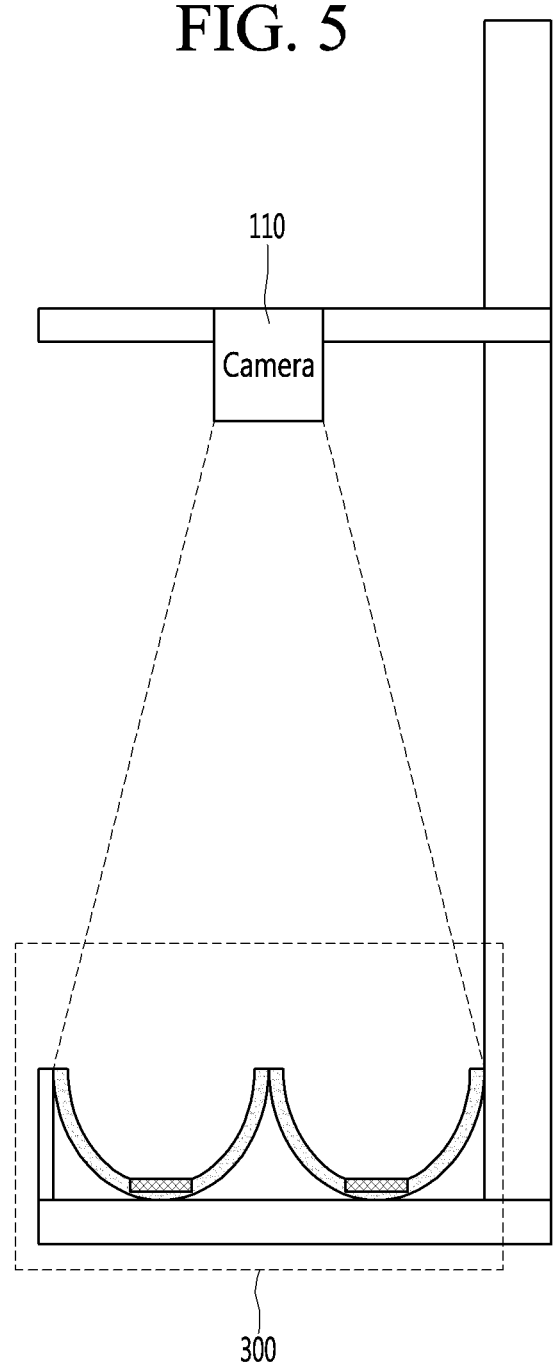

FIGS. 3 to 5 are views illustrating the arrangement structure between a camera and a tray according to an embodiment of the present invention.

Referring to FIG. 3, the tray 300 may be an element which may be accommodated in the refrigerator 10.

The tray 300 may include a plurality of grooves 310 to 340.

An egg may be stored in each of the plurality of grooves 310 to 340. For example, a first egg may be stored in a first groove 310 and a second egg 32 may be stored in a second groove 320.

Each of the plurality of grooves 310 to 340 may be an elliptical storage container capable of storing an egg.

The first egg 31 may be stored in the first groove 310 and the second egg 32 may be stored in the second groove 320.

Each groove may be attached with a marker for identifying the position of each groove.

For example, the first groove 310 may be provided with a first marker 311 for identifying the position of the first groove 310, the second groove 320 may be provided with a second marker 321 for identifying the position of the second groove 320, the third groove 330 may be provided with a third marker 331 for identifying the position of the third groove 330, and the fourth groove 340 may be provided with the fourth marker 341 for identifying the position of the fourth groove 340.

In one embodiment, the marker may be any one of a QR code or a barcode. However, this is merely an example.

The camera 110 may be disposed at the upper side spaced apart from the tray 300.

The camera 110 may periodically capture the image of the tray 300. The camera 110 may periodically capture the image of the tray 300, in order to determine whether one or more of the plurality of markers respectively attached to the plurality of grooves included in the tray 300 is hidden.

The capturing period of the camera 110 may be 5 minutes, but this is merely an example. The camera may capture the image of the tray in real time.

FIG. 4 is a plan view of the tray 300.

FIG. 4 shows the image of the tray captured by the camera 110.

Each of the plurality of grooves of the tray 300 may be attached with one or more light emitting diode (LED).

That is, the first groove 310 may be attached with a first LED 410 and the second groove 320 may be attached with a second LED 420.

Meanwhile, when the first egg 31 is stored in the first groove 310, the first marker 311 shown in FIG. 3 may be hidden.

Similarly, when the second egg 32 is stored in the second groove 320, the second marker shown in FIG. 3 may be hidden.

FIG. 5 is a side view showing arrangement of the camera 110 and the tray 300 disposed in the refrigerator 10.

FIG. 2 will be described again.

The processor 161 of the refrigerator 10 determines whether a hidden marker is present in the plurality of markers respectively attached to the plurality of grooves included in the captured image of the tray (S203).

The processor 161 may determine whether a marker hidden by a food product is present in the plurality of markers included in the image of the tray.

In one embodiment, the processor 161 may store a plurality of position identifiers for respectively identifying the plurality of markers disposed in the plurality of grooves in the memory 140.

The processor 161 may compare the plurality of prestored position identifiers with position identifiers acquired through the image of the tray.

When any one position identifier is not detected through the image of the tray according to the result of comparison, the processor 161 may determine that the marker of the position identifier is hidden.

That is, when any one position identifier is not detected through the image of the tray, the processor 161 may determine that a food product is stored in a groove corresponding to the position identifier and the marker is hidden.

This will be described in greater detail with reference to FIG. 4.

In FIG. 4, assume that the marker is a QR code.

The QR code attached to each groove includes a position identifier for identifying the position thereof.

The processor 161 may read the QR codes included in the image of the tray and detect position identifiers.

For example, assume that the tray 300 is provided with only four grooves 310 to 340 and eggs are stored in the first groove 310 and the second groove 320.

In addition, assume that the memory 140 stores the position identifiers of the QR codes respectively attached to the four grooves 310 to 340.

The processor 161 may read the QR code of the third groove 330 and the QR code of the fourth groove 340 and acquire the position identifier of the third groove 330 and the position identifier of the fourth groove 340.

Since the position identifier of the first groove 310 and the position identifier of the second groove 320 are not acquired, the processor 161 may determine that the eggs are stored in the first groove 310 and the second groove 320.

The processor 161 of the refrigerator 10 acquires the position identifier for identifying the position of the groove corresponding to the hidden marker and a reception time when the food product is received (S205).

In one embodiment, the reception time of the food product may indicate a time when the marker of the groove is hidden.

The processor 161 may acquire the time when the marker of the groove is hidden, from the time when the camera 110 captures the image of the tray.

When the marker hidden by the food is extracted, the processor 161 may acquire a time when the camera 110 captures the image of the tray as the reception time.

The processor 161 of the refrigerator 10 transmits the position identifier of the groove corresponding to the hidden marker and the reception time to the server 200 through the communication unit 150 (S207).

According to another embodiment, the processor 161 may transmit, to the server 20, the position identifier of the groove corresponding to an unhidden marker and a reception time.

The server 20 may store the plurality of position identifiers respectively corresponding to the plurality of grooves.

The server 20 may extract the position identifier of the groove corresponding to the hidden marker through the position identifier of the groove corresponding to the unhidden marker received from the refrigerator 10.

The server 20 calculates the freshness of the food product based on the reception time received from the refrigerator 10 (S209).

In one embodiment, the server 20 may calculate the freshness of the food product expressed by a numerical value based on the reception time received from the refrigerator 10.

The server 20 may calculate a difference between a current time and the reception time.

The server 20 may calculate freshness which decreases as the difference between the current time and the reception time increases, and calculate freshness which increases as the difference between the current time and the reception time decreases.

For example, the freshness may be 90 when the difference between the current time and the reception time is one day, and the freshness may be 70 when the difference between the current time and the reception time is three days.

In another embodiment, the server 20 may calculate freshness based on the reception time received from the refrigerator 10 and the expiration date of the food product acquired from the mobile terminal (not shown) of the user.

The user may execute a food product management application installed in the mobile terminal (not shown) and input the expiration date of the food product on the execution screen of the executed food product management application.

The expiration date of the food product may be transmitted to the server 20.

A process of acquiring freshness based on the expiration data input by the user and the reception time will be described below.

The server 20 determines a color to be displayed on the groove using the calculated freshness (S211).

The server 20 stores correspondence between each of a plurality of freshnesses and each of a plurality of colors in the form of a table.

The server 20 may extract the color corresponding to the freshness and determine the extracted color as the color to be displayed on the groove.

FIG. 6 is a table showing an example of determining a color to be displayed on a groove, in which a food product is stored, based on freshness of the food product according to an embodiment of the present invention.

In the table 600 of FIG. 6, assume that the current time is 01/11 15:00 and the expiration date of the food product is 10 days.

The expiration date of the food product may be received from the mobile terminal of the user.

The server 20 may receive the position identifier of the groove having the hidden marker and the reception time when the food product is received in the groove, from the refrigerator 10.

The server 20 may calculate a retention period indicating the difference between the current time and the reception time.

The server 20 may calculate the freshness of the food product using the expiration date and the retention period.

The server 20 may calculate the freshness of the food product through Equation 1 below.

Freshness=(expiration date−retention period)×10   [Equation 1]

For example, the freshness of the food product received in the first groove 310 having a position identifier value of 1 may be 10 through (10−9)×10.

The freshness of the food product received in the third groove 330 having a position identifier value of 3 may be 50 through (10−5)×10.

The freshness of the food product received in the fourth groove 340 having a position identifier value of 4 may be 70 through (10−3)×10.

The freshness of the food product received in the seventh groove (not shown) having a position identifier value of 7 may be 90 through (10−1)×10.

Meanwhile, the server 20 may store a color corresponding to a freshness range.

For example, the color to be displayed on the groove may be green when the freshness is between 90 and 100, may be yellow when the freshness is between 70 and 80, may be orange when the freshness is between 50 and 60, and may be red when the freshness is between 10 and 20.

The server 20 may determine the color according to the calculated freshness of the food product and transmit information on the determined color to the refrigerator 10 through the communication unit (not shown).

FIG. 2 will be described again.

The server 20 transmits, to the refrigerator 10, color information including the color to be displayed on the groove (S213).

The server 20 may transmit the color information of each of the plurality of grooves corresponding to the hidden markers to the refrigerator 10.

The processor 161 of the refrigerator 10 controls the LED provided in the groove to output the color, using the color information received from the server 20 (S215).

In one embodiment, the color information may include the position identifier of the groove and the color determined in correspondence with the position identifier of the groove.

For example, when the color information indicating that the color to be displayed on the first groove 310 is green is received from the server 20, the processor 161 may control operation of the first LED 410 provided in the first groove 310 to output green light.

To this end, the tray 300 and the processor 161 may perform communication through short-range wireless communication module.

That is, the processor 161 may transmit a color display command for displaying a particular color on a specific groove to the tray 300 through the short-range wireless communication standard.

In another example, when color information indicating that the color to be displayed on the second groove 320 is red is received from the server 20, the processor 161 may control operation of the second LED 420 provided in the second groove 320 to output red light.

The user can intuitively determine the freshness of the food product stored in the groove, by outputting the color of the LED.

When the food product is an egg, the user may visually check information indicating eggs to be eaten early, eggs incapable of being eaten and eggs which may be eaten later, among the eggs stored in the refrigerator 10.

Meanwhile, according to another embodiment of the present invention, the refrigerator 10 may display the numerical value of the freshness of the food product stored in each groove through the display 102.

In another example, the refrigerator 10 may display the freshness of the food product stored in each groove through the display 102 along with the image of the egg stored in the groove.

Figure 7:
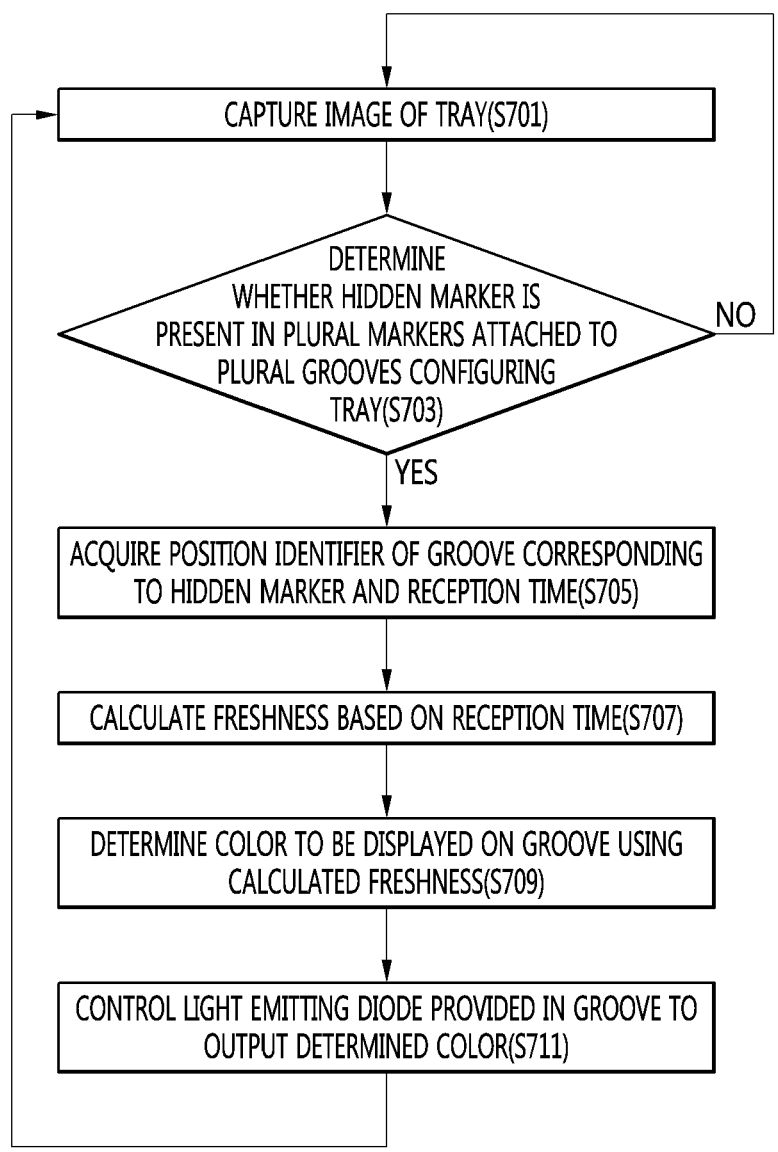
FIG. 7 is a flowchart illustrating a method of operating a refrigerator according to an embodiment of the present invention.

FIG. 7 is a flowchart illustrating a method of operating a refrigerator according to an embodiment of the present invention.

In particular, FIG. 7 is a view illustrating an example in which the refrigerator 10 autonomously calculates the freshness of the food product and directly determines the color to be displayed on the groove in which the food product is stored, without interworking with the server 20 as in the embodiment of FIG. 2.

In FIG. 7, a portion overlapping with the description of FIG. 2 is replaced with the description of FIG. 2.

The camera 110 of the refrigerator 10 captures an image of a tray (S701).

The processor 161 of the refrigerator 10 determines whether a hidden marker is present in a plurality of markers respectively attached to a plurality of grooves included in the captured image of the tray (S703).

The processor 161 of the refrigerator 10 acquires the position identifier for identifying the position of the groove corresponding to the hidden marker and a reception time indicating a time when the food product is received (S705).

The processor 161 of the refrigerator 10 calculates the freshness of the food product based on the reception time (S707).

The processor 161 may calculate a difference between a current time and the reception time.

The processor 161 may calculate freshness which decreases as the difference between the current time and the reception time increases, and calculate freshness which increases as the difference between the current time and the reception time decreases.

For example, the freshness may be 90 when the difference between the current time and the reception time is one day, and the freshness may be 70 when the difference between the current time and the reception time is three days.

In another embodiment, the processor 161 may calculate freshness based on the reception time and the expiration date of the food product acquired from the mobile terminal (not shown) of the user.

The user may execute a food product management application installed in the mobile terminal (not shown) and input the expiration date of the food product on the execution screen of the executed food product management application.

The input expiration date of the food product may be transmitted to the refrigerator 10.

In another example, the user may input the expiration date of the food product through the touch panel 101 of the refrigerator 10.

The processor 161 of the refrigerator 10 determines a color to be displayed on the groove using the calculated freshness (S709).

The refrigerator 10 stores correspondence between each of a plurality of freshnesses and each of a plurality of colors in the memory 140 in the form of a table.

The processor 161 may extract the color corresponding to the freshness and determine the extracted color as the color to be displayed on the groove, using the table stored in the memory 140.

The processor 161 may calculate the freshness of the food product using the embodiment of FIG. 6.

The processor 161 of the refrigerator 10 controls the LED provided in the groove to output the color using the determined color information (S711).

According to the embodiment of FIG. 7, the refrigerator 10 can autonomously provide the user with the freshness of the food product stored in the tray 300, without interworking with the server 20.

The foregoing description is merely illustrative of the technical idea of the present invention, and various changes and modifications may be made by those skilled in the art without departing from the essential characteristics of the present invention.

Therefore, the embodiments disclosed in the present invention are to be construed as illustrative and not restrictive, and the scope of the technical idea of the present invention is not limited by these embodiments.

The scope of the present invention should be construed according to the following claims, and all technical ideas within equivalency range of the appended claims should be construed as being included in the scope of the present invention.

What is claimed is:

1. An artificial intelligence refrigerator comprising:
a communication unit;
a camera configured to capture an image of a tray including a plurality of grooves for storing food; and
a processor configured to control the communication unit and the camera,
wherein the processor is further configured to:
determine whether a hidden marker is present in a plurality of markers respectively attached to the plurality of grooves from the captured image of the tray,
based on determining that the hidden marker is present, acquire a position identifier of a groove corresponding to the hidden marker and a reception time indicating that the food is received in the groove,
transmit the acquired position identifier and the reception time to a server through the communication unit,
receive determined color information from the server based on the reception time, and
control a light emitting device provided in the groove to output a color to be displayed on the groove included in the received color information.

2. The artificial intelligence refrigerator according to claim 1, further comprising a memory configured to store a plurality of position identifiers including the position identifier of the groove corresponding to the hidden marker,
wherein the processor is further configured to compare an acquired position identifier of a non-hidden marker from the image of the tray with the plurality of position identifiers and acquire the position identifier of the groove corresponding to the hidden marker based on a result of the comparison.

3. The artificial intelligence refrigerator according to claim 2, wherein the processor acquires a time when the image of the tray is captured as the reception time, when the marker hidden by the food is extracted.

4. The artificial intelligence refrigerator according to claim 1,
wherein the light emitting device is a organic light emitting diode (LED), and
wherein the processor is further configured to transmit, to the tray, a color display command for enabling the LED to display the color.

5. The artificial intelligence refrigerator according to claim 1, wherein the marker is any one of a QR code or a barcode.

6. An artificial intelligence refrigerator comprising:
a memory;
a tray including a plurality of grooves for storing food;
a camera configured to capture an image of the tray; and
a processor configured to
determine whether a hidden marker is present in a plurality of markers respectively attached to the plurality of grooves from the captured image of the tray,
based on determining that the hidden marker is present, acquire a position identifier of a groove corresponding to the hidden marker and a reception time indicating that the food is received in the groove, and
calculate freshness of the food stored in the groove using the acquired position identifier and a reception time and controls a light emitting device provided in the groove to output a color corresponding to the calculated freshness.

7. The artificial intelligence refrigerator according to claim 6, wherein the processor is further configured to calculate the freshness using a retention period which is a difference between a current time and the reception time.

8. The artificial intelligence refrigerator according to claim 7, wherein the processor is further configured to:

receive an expiration date of the food from a mobile terminal, and calculate the freshness using the received expiration date and the retention period.

9. The artificial intelligence refrigerator according to claim 8, wherein the memory stores a table indicating correspondence between the freshness and a color, and wherein the processor extracts a color matching the calculated freshness using the table and controls the light emitting element provided in the groove to output the extracted color.

10. The artificial intelligence refrigerator according to claim 6, wherein the memory stores a plurality of position identifiers including the position identifier of the groove corresponding to the hidden marker, wherein the processor is further configured to compare an acquired position identifier of a non-hidden marker from the image of the tray with the plurality of position identifiers and acquire the position identifier of the groove corresponding to the hidden marker based on a result of the comparison.

11. The artificial intelligence refrigerator according to claim 6, wherein the processor acquires a time when the image of the tray is captured, as the reception time, when the marker hidden by the food is extracted.

* * * * *